Sept. 5, 1939.   C. J. MALM ET AL   2,172,250
MANUFACTURE OF MIXED ORGANIC ACID ESTERS OF CELLULOSE
Filed Dec. 23, 1938
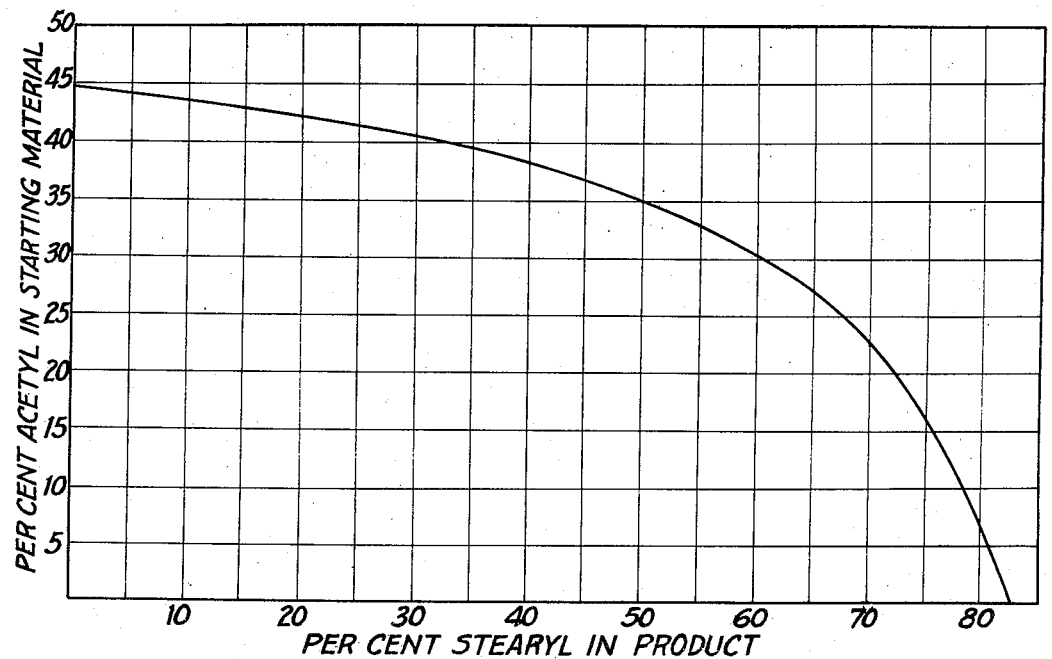
Inventors
Carl J. Malm
Gordon D. Hiatt Patented Sept. 5, 1939

2,172,250

UNITED STATES PATENT OFFICE 2,172,250

MANUFACTURE OF MIXED ORGANIC ACID ESTERS OF CELLULOSE

Carl J. Malm and Gordon D. Hiatt, Rochester, N. Y., assignors to Eastman Kodak Company, Rochester, N. Y., a corporation of New Jersey Application December 23, 1938, Serial No. 247,452

5 Claims. (Cl. 260—225)

The present invention relates to the production of mixed organic acid esters and ether esters of cellulose containing combined acids which are insoluble or only sparsely soluble in water such as cellulose acetate stearate and ethyl cellulose stearate by reacting upon a lower fatty acid ester or an ether of cellulose containing free and esterifiable hydroxyl groups with a reaction bath containing sufficient, or not quite sufficient, higher aliphatic acid to combine with the free hydroxyl groups and an inert low-boiling solvent, followed by precipitation of the ester in warm water.

It has been previously known to treat cellulose acetate with a mixture of chloracetic anhydride, chloracetic acid, higher aliphatic acid and catalyst to produce a cellulose higher acylate. With the amounts of higher acid employed the use of water for precipitating and washing the ester formed was impossible. If, however, in those processes the amount of higher acid is restricted the precipitation in water is possible. In order to carry out such a process of making mixed cellulose esters on a commercial scale, recovery of the chloracetic acid is necessary. As this acid is markedly corrosive the recovery of the chloracetic acid presents a difficulty which renders that process, using precipitation in water, impossible.

One object of our invention is to provide a process for preparing esters of the nature of cellulose acetate stearate in which water may be employed for both the precipitation and the washing of the ester. Another object of our invention is to provide a process for making esters of the cellulose acetate stearate type in which there is little, if any, waste of solvent. A further object of our invention is to provide a process for making cellulose acetate stearate, or the like, in which most of the materials which are present at the end of the esterification reaction may be easily recovered. Other objects will appear herein.

We have found that mixed esters of cellulose containing some aliphatic acid groups of at least six carbon atoms may be prepared by reacting upon cellulose acetate having free and esterifiable hydroxyl groups with a mixture essentially consisting of chloracetic or an alkoxyacetic anhydride, an inert low-boiling solvent, an aliphatic acid of at least six carbon atoms in approximately (but not more than) sufficient amount to react with the free hydroxyl groups of the cellulose and an esterification catalyst. Our invention is carried out by using a lower fatty acid ester or an ether of cellulose such as cellulose acetate, cellulose acetate propionate, cellulose acetate butyrate or ethyl cellulose which is not fully esterified or etherified. The most convenient starting material to employ is the ordinary commercial, acetone-soluble cellulose acetate which has an acetyl content of 38 to 40%. Only sufficient higher aliphatic acid is empoyed in the esterification to combine with the hydroxyl groups. A low boiling solvent such as methylene chloride is employed in an amount at least sufficient to act as a solvent for the reagents used and for the mixed ester which is formed. Our process is especially adapted for use of the aliphatic acids having a large number of carbon atoms such as stearic acid, linoleic acid, oleic acid, palmitic acid and the like.

The accompanying drawing is a graphic representation of the percent of stearyl in a mixed ester prepared in accordance with our invention compared with the percent of acetyl in the cellulose acetate used as the starting material. As commercial stearic acid was employed which is a mixture of stearic and palmitic acids, a molecular weight of 268 was taken for the commercial stearic acid, the palmitic and stearic acids therein being in a proportion which would give this figure as the average molecular weight. From the drawing, the amount of commercial stearic acid which is sufficient to form the fully esterified product from cellulose acetate of a known acyl content, can be readily calculated. In some other acid such as oleic, pure stearic, or the like, is employed, a similar curve may be drawn from which the proper amount of higher acid to use with a cellulose acetate having a given percent of acetyl may be readily calculated.

In precipitating the cellulose ester from the reaction mixture, it is preferable to use water which has a temperature at which the methylene chloride will readily flash off or evaporate. The vapors of methylene chloride may then be condensed and the resulting distillate of methylene-chloride-water is collected. The amount of chloracetic acid formed from the chloracetic anhydride during the reaction is sufficiently small to make it economical to discard it, thus eliminating any recovery difficulties. If desired, instead of using one higher acid to esterify the cellulose acetate, a mixture of higher acids may be employed. This is illustrated by the use of commercial stearic acid.

The following examples illustrate the preparation of a mixed organic acid ester of cellulose in accordance with our invention:

Example I

3½ lbs. of cellulose acetate containing 38% of acetyl was treated with a mixture of 2½ lbs. of chloracetic anhydride, 2.2 lbs. of commercial stearic acid, 2 lbs. of methylene chloride and 2% of p-toluene sulphonic acid based upon the weight of the acetate. The reaction was carried out for 3 to 4 hours at 40° C. The resulting product which was cellulose acetate-palmitate-stearate was isolated by slowly pouring the reaction mixture into warm water having a temperature above the boiling point of methylene chloride. The methylene chloride vapors were led to a condenser and the methylene chloride was thereby recovered. The ester precipitated in a soft fibrous condition which was readily susceptible to solution by an organic solvent.

*Example II*

To a mixture of 15 parts of chloracetic anhydride and 50 parts of ethyl acetate, 17 parts of a 38% acetyl cellulose acetate was added. When a homogeneous dope formed 12 parts of commercial stearic acid was added followed by the addition of 0.1 part of magnesium perchlorate. This mixture was maintained at 60° C. for 3 hours. The ester was recovered as above by precipitation in warm water. A cellulose acetate-palmitate-stearate was obtained.

*Example III*

3.5 pounds of ethyl cellulose was dispersed in a mixture of 5 pounds of ethyl methyl ketone and 2.7 pounds of chloracetic anhydride. The cellulose ether contained 49.4% ethoxyl and therefore had 0.4 free hydroxyl groups per glucose unit. To this dope was added 0.5 per cent of magnesium perchlorate, based on the weight of cellulose ether, and 1.1 pounds of oleic acid. A bright uniform dope resulted in 2 hours at 45° C. which yielded a white fluffy precipitate when poured into water. An ethyl cellulose oleate was obtained.

We claim:

1. The process of preparing a cellulose derivative containing combined organic acids which are insoluble, or only sparingly soluble in water, which comprises esterifying a cellulose compound containing free and esterifiable hydroxyl groups with a reaction mixture essentially consisting of chloroacetic anhydride, an aliphatic acid of at least 6 carbon atoms in an amount near to but not more than sufficient to combine with the free hydroxyl groups of the cellulose compound, an inert low boiling solvent and an esterification catalyst and subsequently separating the cellulose ester therefrom by precipitating in water.

2. The process of preparing a mixed organic acid ester of cellulose which comprises esterifying cellulose acetate containing free and esterifiable hydroxyl groups with a reaction bath essentially consisting of chloracetic anhydride, an aliphatic acid of at least 6 carbon atoms in an amount near to but not more than sufficient to combine with the free hydroxyl groups of the cellulose acetate, methylene chloride and an esterification catalyst and subsequently separating the mixed ester therefrom by precipitating in water having a temperature above the boiling point of the methylene chloride.

3. The process of preparing a cellulose acetate stearate which comprises esterifying cellulose acetate containing free and esterifiable hydroxyl groups with a reaction bath essentially consisting of chloracetic anhydride, stearic acid in an amount near to but not more than sufficient to combine with the free hydroxyl groups of the cellulose acetate, methylene chloride and an esterification catalyst and subsequently separating the cellulose acetate stearate therefrom by precipitating in water having a temperature above the boiling point of methylene chloride.

4. The process of preparing a cellulose acetate linoleate which comprises esterifying cellulose acetate containing free and esterifiable hydroxyl groups with a reaction bath essentially consisting of chloracetic anhydride, linoleic acid in an amount near to but not more than sufficient to combine with the free hydroxyl groups of the cellulose acetate, methylene chloride and an esterification catalyst and subsequently separating the cellulose acetate linoleate therefrom by precipitating in water having a temperature above the boiling point of methylene chloride.

5. The process of preparing a cellulose acetate oleate which comprises esterifying cellulose acetate containing free and esterifiable hydroxyl groups with a reaction bath essentially consisting of chloracetic anhydride, oleic acid in an amount near to but not more than sufficient to combine with the free hydroxyl groups of the cellulose acetate, methylene chloride and an esterification catalyst and subsequently separating the cellulose acetate oleate therefrom by precipitating in water having a temperature above the boiling point of methylene chloride.

CARL J. MALM.
GORDON D. HIATT.